(12) United States Patent
Harris

(10) Patent No.: US 7,713,496 B2
(45) Date of Patent: May 11, 2010

(54) WATER PURIFIER WITH UV AND ADSORBENT

(75) Inventor: James M. Harris, Menlo Park, CA (US)

(73) Assignee: Crystal Clear Technologies, Inc., Menlo Park, CA (US)

( * ) Notice: Subject to any disclaimer, the term of this patent is extended or adjusted under 35 U.S.C. 154(b) by 1189 days.

(21) Appl. No.: 11/297,163

(22) Filed: Dec. 7, 2005

(65) Prior Publication Data

US 2007/0125713 A1 Jun. 7, 2007

(51) Int. Cl.
C02F 1/42 (2006.01)
(52) U.S. Cl. .................. 422/186.3; 210/663; 210/748.1
(58) Field of Classification Search ................. 210/748, 210/663, 186.3, 186; 422/186.3, 905, 186
See application file for complete search history.

(56) References Cited

U.S. PATENT DOCUMENTS

| | | | | |
|---|---|---|---|---|
| 5,302,356 | A * | 4/1994 | Shadman et al. ......... | 422/186.3 |
| 5,942,110 | A | 8/1999 | Norris | |
| 6,514,420 | B2 * | 2/2003 | Kuennen et al. ............ | 210/748 |
| 6,583,422 | B2 | 6/2003 | Boehme | |
| 2003/0129105 | A1 | 7/2003 | Boehme | |
| 2004/0108274 | A1 * | 6/2004 | Schulze-Makuch et al. . | 210/660 |
| 2005/0016907 | A1 | 1/2005 | Yuen | |

OTHER PUBLICATIONS

Vickaryous, W.Jake; Arsenic-p Interactions Stabilize a Self-assembled As2L3 Supramolecular Complex.; Angew.Chem.Int.Ed., 2004, 43, 5831.

* cited by examiner

*Primary Examiner*—Walter D Griffin
*Assistant Examiner*—Cameron J Allen
(74) *Attorney, Agent, or Firm*—Fernandez & Associates, LLP

(57) ABSTRACT

The invention has two primary portions, a means to provide ultra-violet radiation and a means for adsorbing organic, inorganic and, optionally, pathogens. The means to provide ultra-violet radiation comprises ultra-violet light sources emitting, at least in part, in the spectrum around 265 nm. Light emitting devices, including light emitting diodes and other solid state light emitting devices are available in this range as well. The adsorbent portion comprises several different adsorbent media, including zeolites, titanium dioxide ($TiO_2$), alumina, carbon, micro- and/or nano-porous carbon, other minerals with a naturally occurring micro- and/or nano-porous structure, synthetic, including organic, substrates with a micro- and/or nano-porous structure, and surface-modified variations of the preceding adsorbents.

7 Claims, 5 Drawing Sheets

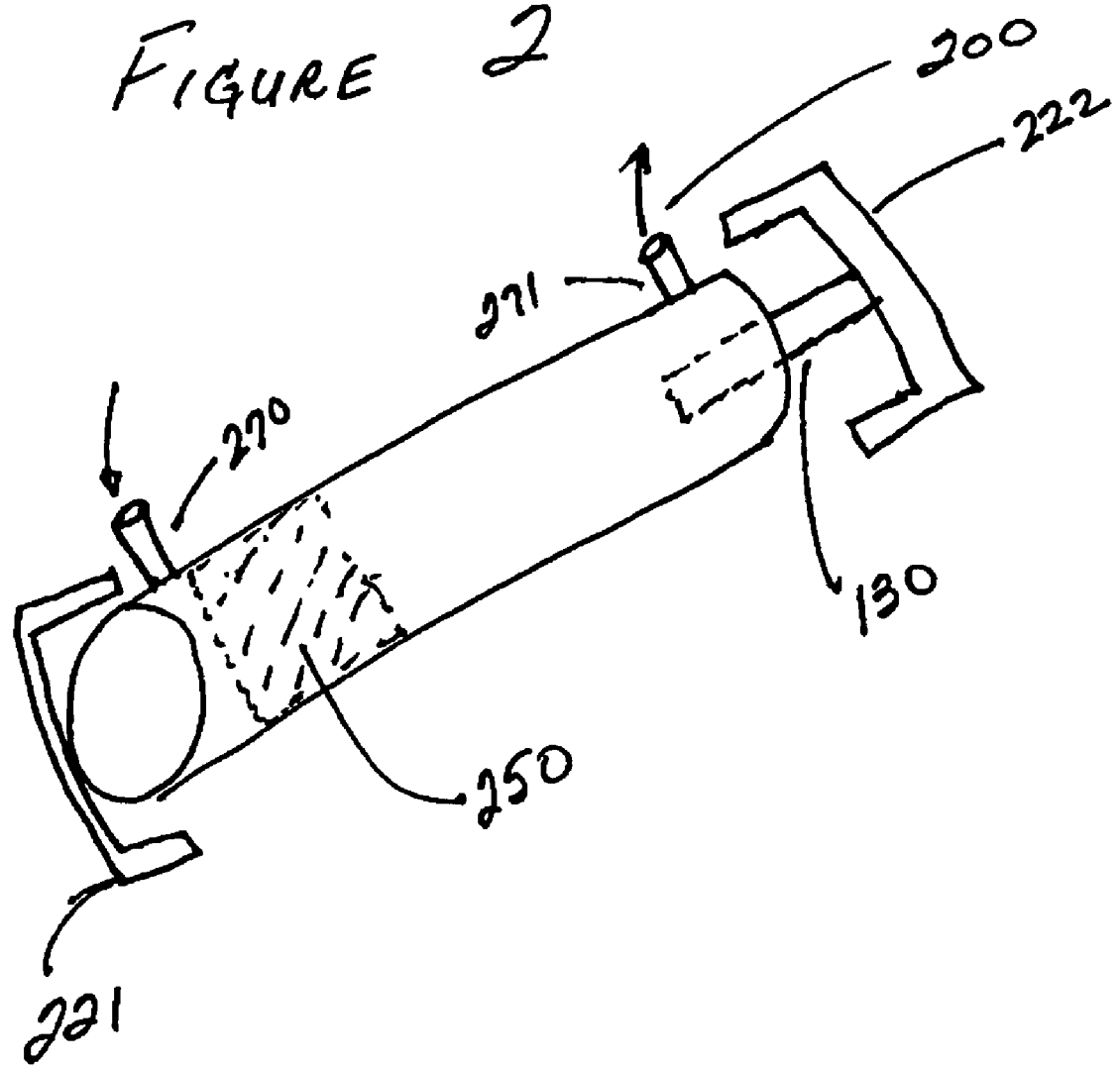

Bifunctional ligand classes

Silanes used to functionalize zeolite.

WATER PURIFIER WITH UV AND ADSORBENT

FIELD OF INVENTION

This invention relates generally to apparatus comprising an ultra-violet irradiation portion and an adsorbent portion for purifying water.

BACKGROUND OF INVENTION

Ultraviolet radiation has been used to inactivate pathogens in water and air since the 1920's; adsorbents have been used to clean water for far longer. One commercially available product from eSpring™ [www.eSpring.com; Dec. 5, 2005] offers an ultraviolet lamp plus carbon block home device for treating water; a caution on the product advises "The eSpring Water Purifier is designed for use with any municipally treated drinking water source or potable well/bore water. It is not intended for use on lake, river, or any other non-approved water sources.". Two points, the "carbon block" described appears to be functioning as a very fine filter and not making use of any porous properties of activated carbon; secondly, why one would treat potable water with an ultra-violet lamp is not apparent. The technology to clean water to virtually any level of purity desired has been available for some time; the semiconductor industry has fostered the use of ultra-clean chemicals, including water, since its inception. However, technology is not the issue; cost is the issue. The scarcity of potable drinking water in the third world at an affordable price is a problem the instant invention seeks to alleviate.

U.S. Pat. No. 5,942,110 reviews the prior art including different chamber and lamp configurations. [110] teaches a wall mounted treatment apparatus with inner and outer sleeves, internal mirrored surface, o-ring gaskets and many different components. [110] is a good example of a well built uv treatment apparatus that is far too expensive for a mass market. U.S. Pat. No. 6,583,422 teaches a chamber tube, replaceable clamps and a length adjustable chamber tube; this design is less expensive than [110] however it is not simple enough and it utilizes only one technology; the invention can not purify water with organic or inorganic contaminants. U.S. 2003/0129105 teaches a disinfection reactor with a plurality of quartz sleeves and uv lamps positioned perpendicular to the water flow; again this design is too expensive for mass appeal. U.S. 2005/0016907 teaches an electro-optical water purifier with a spiral pipeline and a plurality of uv emission tubes; this apparatus is overly complex and expensive.

Typical household water filters containing carbon have limited effectiveness with regard to pathogens and metals. Carbon by itself is quite good for removing chlorine and a few other taste degrading compounds but has marginal purification capability. In addition, if used incorrectly carbon becomes a breeding ground for pathogens.

All of the prior art suffer from high cost and failure to integrate synergistic technologies to achieve acceptable water purification under a broad range of conditions. A simple solution is needed which achieves multi-contaminant water purification and low cost.

SUMMARY OF INVENTION

One object of the present invention is to provide a low cost, portable water purifier for an individual which can purify water of uncertain origin to potable levels within minutes of activation. Another object of the present invention is to provide a low cost, table top purifier which can be used much like a pitcher or bottle of water. Another object of the present invention is to provide a low cost water purifier which can be mounted on a water faucet. Another object of the present invention is to provide a low cost water purifier which can be mounted under a sink. Another object of the present invention is to provide a low cost water purifier which can be positioned at the water entry point to a dwelling or other activity location. Another object of the present invention is to provide a low cost water purifier which can be located in a vehicle such as a recreational vehicle, airplane, ship, railroad car, bus or van.

The invention has two primary portions, a means to provide ultra-violet radiation and a means for adsorbing organic, inorganic and, optionally, pathogens. The means to provide ultra-violet radiation comprises ultra-violet light sources emitting, at least in part, in the spectrum around 265 nm. Mercury and other halogen lamps are well suited for this purpose and commercially available; one example is a Philips TUV4T5 Germicidal Streetlamp®. Light emitting devices, including light emitting diodes and other solid state light emitting devices are available in this range as well. Xenon flash lamps have been used for some time in water purification applications. Up shifting and down shifting phosphors in combination with a light emitting device are also candidates. Published data on the germicidal effects of ultraviolet radiation indicate pathogen inactivation effectiveness peaks around 265 nm; light sources suitable for this invention may radiate in a range from about 200 nm to over 350 nm, preferably in a narrow band around 265 nm.

The adsorbent portion comprises several different adsorbent media, including zeolites, titanium dioxide ($TiO_2$), alumina, carbon, micro- and/or nano-porous carbon, other minerals with a naturally occurring micro- and/or nano-porous structure, synthetic, including organic, substrates with a micro- and/or nano-porous structure, surface-modified variations of the preceding adsorbents and other adsorbents known to those knowledgeable in the art. Also included in the scope of adsorbent means for the instant invention are mixtures of two or more of the different adsorbents just listed. For the instant invention, surface modification includes additional coatings which may be applied to adsorbent media. Also included are various surface treatments which may increase the chemical or catalytic activity of the micro- and/or nano-porous structure of adsorbent media. Surface modification treatments may include plasma etching, heat treatments, oxidation, hydrogenation, carbonization, sulfurization and others known to those knowledgeable in the art. U.S. 2004/0108274 describes one example of a surface-modified zeolite capable of adsorbing organics, inorganics and pathogens; in this invention hexadecyltrimethylammonium (HDTMA) is used as a surface modification coating. Application number 11/350,202 describes a different technique of achieving a surface coating with adsorbent enhancing capability. Application Ser. No. 11/350,202 and US 2004/0108274 are included herein in their entirety by reference.

By combining uv irradiation and adsorption technologies a low cost, widely effective purifier is manufacturable. Different embodiments of the instant invention can serve different applications ranging from a small portable device to an apparatus suitable for purifying all of the water coming into a home or small village or even larger applications.

BRIEF DESCRIPTION OF DRAWINGS

FIG. 2 is a schematic of another embodiment of the invention for use in a home.

DETAILED DESCRIPTION OF EMBODIMENTS

A key feature of the instant invention is the exposure of water to be purified to adsorbent media prior to or during the ultra-violet irradiation step. All solid contaminants, some transparent impurities and some chemicals in solution adsorb ultra-violet radiation resulting in a lowering of the efficiency for inactivation of pathogens by uv radiation. Lowered efficiency increases the effective exposure time, at least, required to inactivate pathogens and consequently the cost. By using adsorbents to remove contaminants the efficiency of the irradiation step is improved. A mixture of adsorbents is frequently more effective at removing a variety of impurities than a single adsorbent. Given an analysis of a water source, an optimum adsorbent mixture can be designed. In the U.S. the most frequent municipal water mishaps result in pathogens, typically *E. Coli,* in the water stream.

Figure 5:
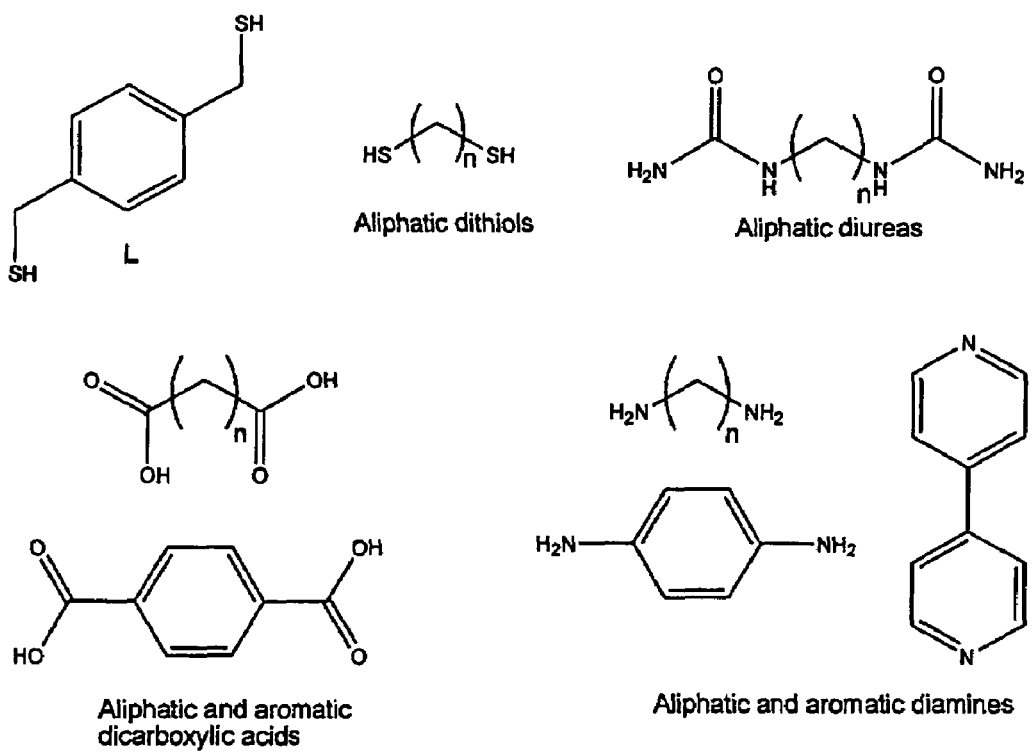
FIG. 5 shows bifunctional ligand classes.
Figure 6:
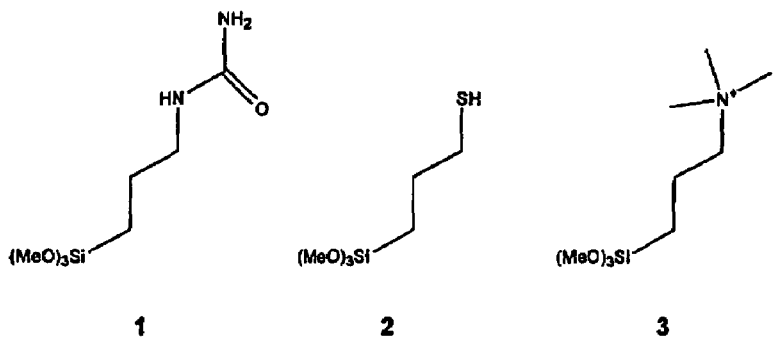
FIG. 6 is shows silanes used to functionalize zeolite.

Surface modified zeolites have been shown to be effective against a number of pathogens. Unfortunately their effectiveness with regard to Giardia and Cryptosporidium is slight. However, SMZ in conjunction with an ultra-violet irradiation source has the ability to provide a broader range of water treatment and purification than either technology alone. In addition, SMZ will remove pathogens such as *E. Coli* and *salmonella*; such removal also improves the effectiveness of the uv portion of the purifier device. Examples of materials used for surface modification coatings are hexadecyltrimethylammonium (HDTMA), bifunctional ligands, di-functional molecules, benzyldithiol, such as dimercaptoxylene and trimethoxysilanes; examples are shown in FIGS. 5 and 6.

Figure 1A:
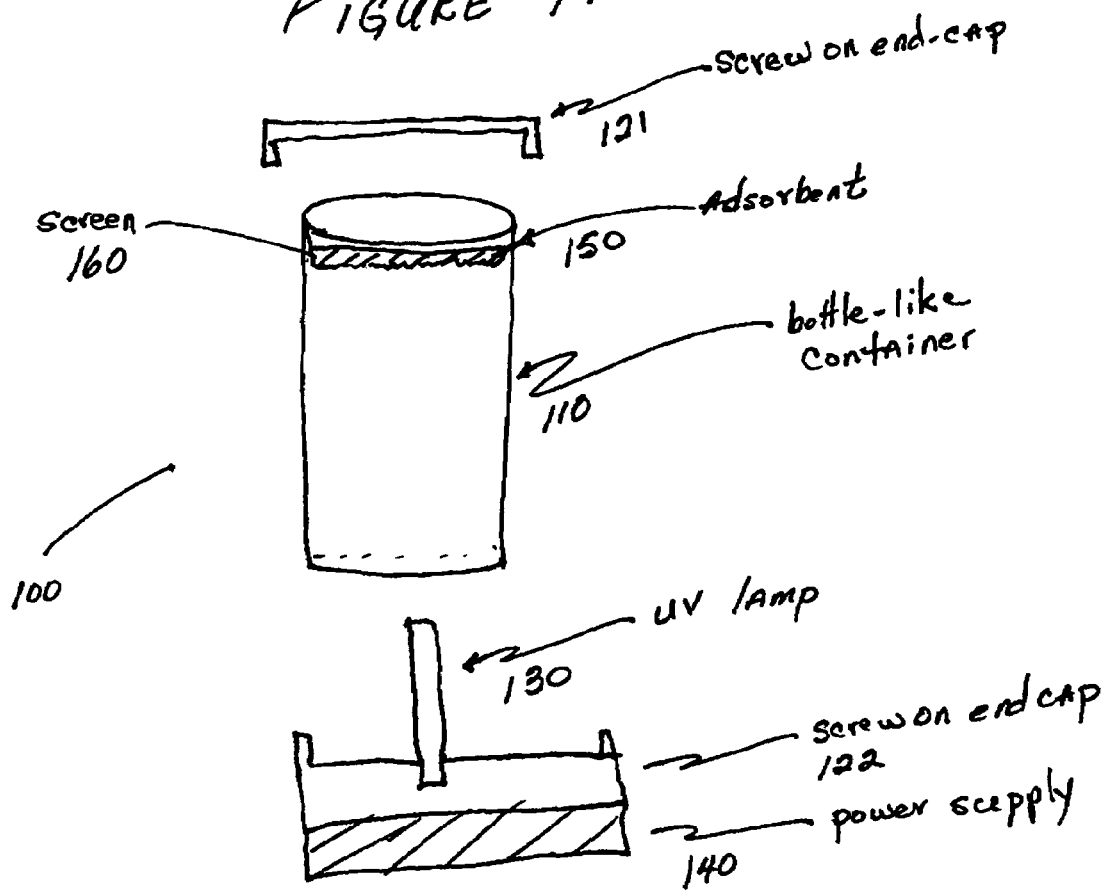
FIG. 1A and 1B are schematics of one embodiment of the invention with a bottle-like container.
Figure 1B:
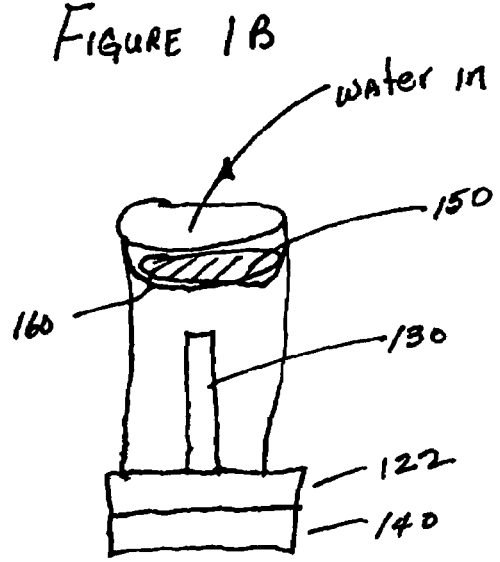

In some embodiments the adsorbent is positioned in the interior and at one end of a container such that water entering the container flows through the adsorbent; this is shown schematically in FIGS. 1A and 1B. In these embodiments the adsorbent 150 may be held inside one or more small bags, not unlike a tea bag. The amount of adsorbent in a bag is determined by the anticipated beginning purity of the water to be rendered potable and the quantity of water desired to be purified. For instance, one gram of adsorbent may be appropriate for one liter of water based on several factors such as what the major contaminants are, contact time and various constituents of the adsorbent mix. Conventional filter cartridge configurations for an adsorbent mixture are used in some embodiments; devices for purifying water storage containers in vehicles are an example of these embodiments. In some embodiments the adsorbent is simply loose in a purification container. Typically various sizes and shapes of containers, comprising interior and exterior surfaces and at least one opening, may be used for holding water to be purified. In one embodiment a container 100 is a bottle shaped device with two end caps 121 and 122; one end cap 121 screws on in a conventional manner; the other end cap 122 also screws on; however mounted on this end cap 122 is an ultra-violet lamp 130 and power supply portion 140 comprising, for example, at least one battery; electronics connecting to a solar cell, remote or integral, may be another power supply means; in an embodiment a connector enables electrical connection between a uv lamp and a remote power capability. Water may be introduced or withdrawn from either end. In one embodiment a screen mesh 160 is placed inside a bottle like container 100, close to a first end cap 12; an adsorbent 150, either in small bags or not, is placed on the screen such that water introduced into the container must flow through the adsorbent before reaching the interior of the container, as shown in FIG. 1B. The screen mesh also serves to keep debris from reaching the interior of the bottle like container; debris in the water reduces the uv effectiveness greatly. After a prescribed time period for adsorbent 150 to adsorb, uv lamp 130 attached to the second end cap is activated for a second prescribed time period to complete the water purification process. AquaStar by Meridian Design, Inc. [www.uvaquastar.com] is a product using a somewhat similar concept but without the advantages of removing contaminants and debris from the water prior to uv treatment.

In another embodiment, shown in FIG. 2, a container may comprise a cylindrical tube or pipe like device 200 meant to be placed inline on a kitchen or home water supply line. In this embodiment end caps 221 and 222 are used to provide access to the uv lamp 130 and adsorbent 250 for replacement purposes. Additional connecting means 270, inlet, and 271, outlet, may be fitted with unions or compression fittings or other mechanical couplings to attach a cylindrical like container 200 to a home water line (not shown). For the instant invention connecting means comprise screw on caps, inlet pipes or tubes, outlet pipes or tubes, pipe unions, couplings, flexible couplings, screw-on-connectors and other techniques well known in the plumbing trade. Of course the cylindrical like container is several times larger in diameter than a water line to allow for insertion of an adsorbent container and a uv source; FIG. 2 shows one embodiment.

Figure 3A:
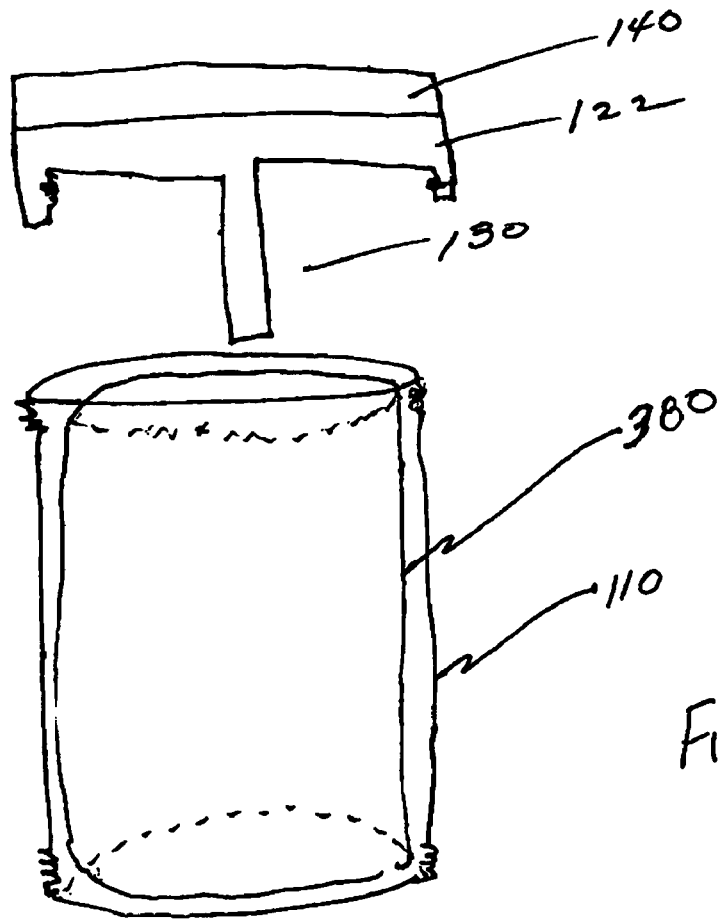
FIG. 3 is a schematic of another embodiment of the invention with a container.
Figure 3C:
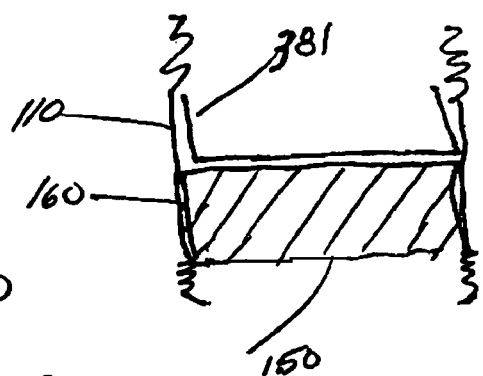
Figure 3B:
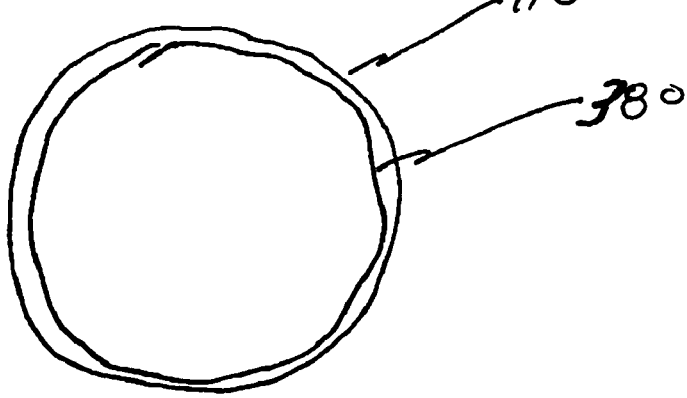
Figure 4A:
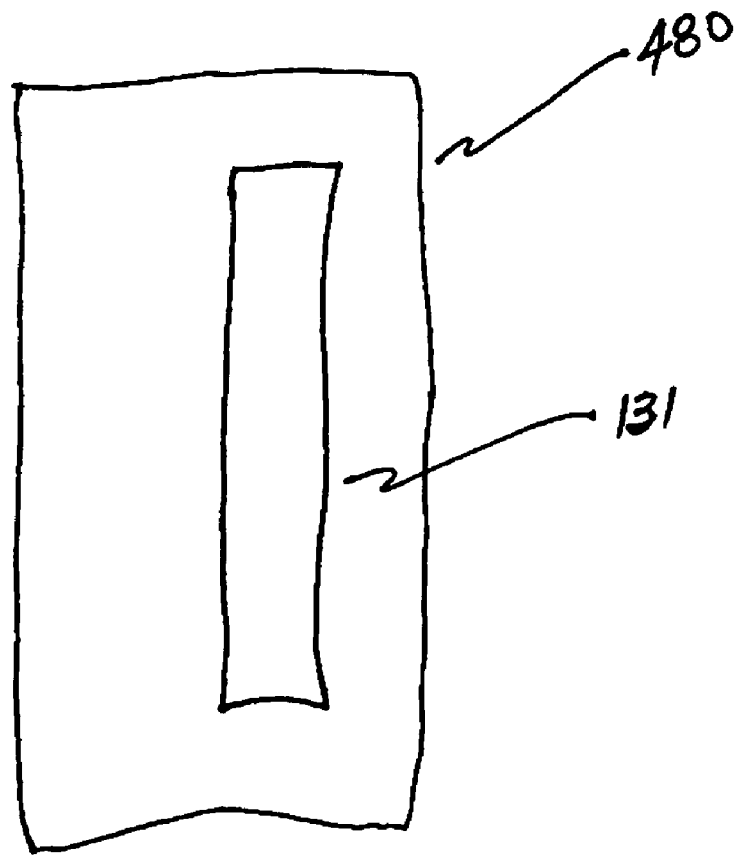
FIG. 4 is a schematic of another embodiment of the invention with a reflector over a portion of a lamp.
Figure 4B:
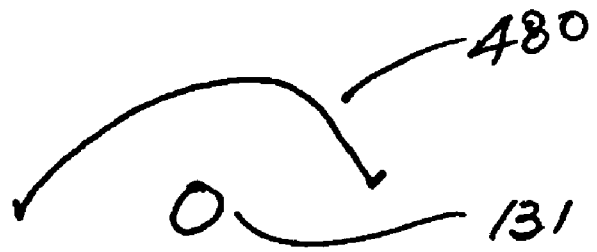

Current EPA standards require a minimum ultra-violet radiation dose of 40 milli-joules per $cm^2$ area. New standards in California raise the minimum dose to 300 milli-joules per $cm^2$ area. Rarely is a home uv purifier equipped with a reflector so as to obtain multiple reflections from the radiating source. A reflector 380 may be positioned around the outer internal surface of a container 110 as shown in FIGS. 3A and 3B. When a solid state device source is used a very collimated beam is emitted; in this embodiment a reflector 181 on one end of a container may be optimum, as shown in FIG. 3C; perforations, not shown, in the reflector allow water to flow into the container from the adsorbent 150. Over time. most organic materials are degraded by exposure to ultra-violet radiation; however since organics are typically cheaper and lighter than metallic containers organic containers are preferred in low cost applications. A preferred embodiment of the instant invention uses a plastic container with a removable, metallic reflector shielding the container walls from the uv radiation. Alternatively the plastic container walls may be coated with a uv reflective thin film, metallic or ceramic. One exemplary coating is $TiO_2$. $TiO_2$ irradiated with ultra-violet has a catalytic effect on improving the oxidation of some organics to harmless by products in the presence of ultra-violet radiation. In alternative embodiments of the instant invention a reflector 480 may be located along one axis of a radiation source 131, as along a backside of a lamp as shown in FIG. 4A and B. This embodiment is preferred when a container is large and the lamp is positioned near a wall.

Ultra-violet radiation impinging on oxygen can create ozone, a chemical known for its water purification capabilities. In some embodiments a ultra-violet producing means is positioned to excite oxygen into ozone for the purposes of water treatment.

Foregoing described embodiments of the invention are provided as illustrations and descriptions. They are not intended to limit the invention to precise form described. In particular, it is contemplated that functional implementation of invention described herein may be implemented equivalently. Alternative construction techniques and processes are apparent to one knowledgeable with integrated circuit and MEMS technology. Other variations and embodiments are possible in light of above teachings, and it is thus intended that the scope of invention not be limited by this Detailed Description, but rather by claims following.

What I claim is:

1. A device for purifying water comprising:
a means for adsorbing at least one metallic contaminate comprising a surface-modified adsorbent; and
a means for irradiating; wherein the surface-modified adsorbent comprises at least a SH group and the means for irradiating irradiates the water after the means for adsorbing adsorbs at least one metallic contaminate.

2. The device of claim 1 wherein said means for adsorbing comprises at least one of a group comprising zeolites, titania ($TiO_2$), alumina, carbon, micro- and/or nano-porous carbon, minerals with a naturally occurring micro- and/or nano-porous structure, synthetic, including organic, substrates with a micro- and/or nano-porous structure, and surface-modified variations of the preceding adsorbents.

3. The device of claim 1 wherein said means for irradiating comprises at least one of a group comprising mercury lamp, halogen lamp, solid state light emitting device and flash lamp such that the spectrum of said irradiating means is in at least a portion of the range from about 200 nm to about 400 nm.

4. The device of claim 1 further comprising a reflector wherein the reflector is located downstream of said means for adsorbing.

5. The device of claim 4 wherein said reflector further comprises a reactive coating.

6. A device for removing contaminants from water comprising:
a portion for adsorbing comprising at least one surface-modified adsorbent wherein the at least one surface-modified adsorbent comprises at least one SH group and adsorbs at least one metallic contaminate; and
a portion for irradiating comprising a reflector;
such that the portion for adsorbing adsorbs at least one metallic contaminate from the water prior to the irradiating portion.

7. A device for removing contaminants from water as in claim 6 wherein the reflector comprises a catalytic coating for enabling reactions.

\* \* \* \* \*